Nov. 9, 1954   C. F. TEICHMANN   2,694,152
DETECTION AND MEASUREMENT OF RADIATION
Filed Jan. 13, 1950
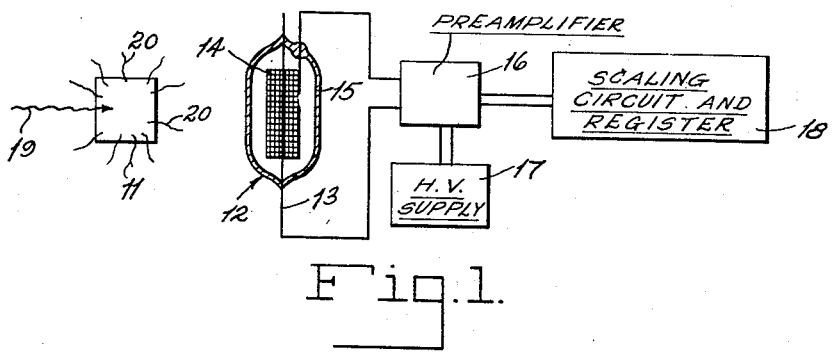
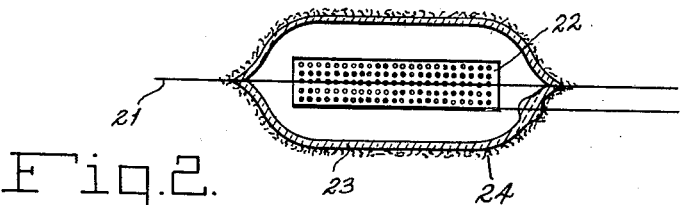
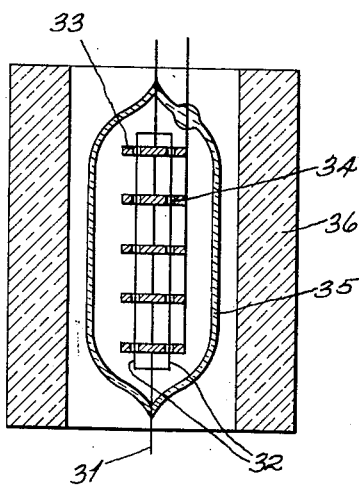
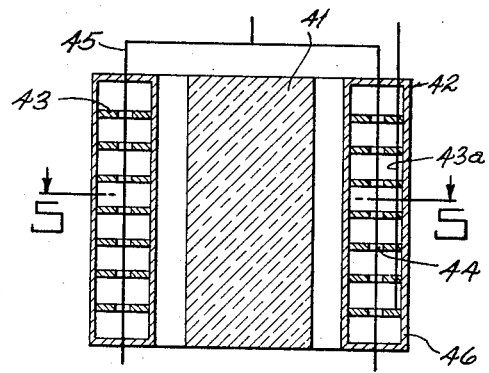
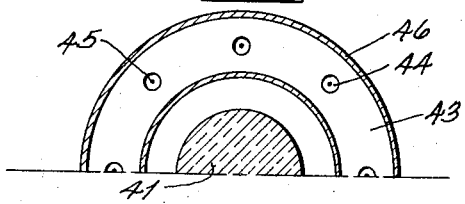
INVENTOR.
CHARLES F. TEICHMANN
BY
ATTORNEYS

United States Patent Office 2,694,152
Patented Nov. 9, 1954

2,694,152

DETECTION AND MEASUREMENT OF RADIATION

Charles F. Teichmann, Crestwood, N. Y., assignor to Texaco Development Corporation, New York, N. Y., a corporation of Delaware Application January 13, 1950, Serial No. 138,341

9 Claims. (Cl. 250—71)

This invention relates to the detection and measurement of penetrative radiation such as gamma rays.

The detection and measurement of penetrative radiation such as gamma rays with a considerable degree of accuracy has been a difficult problem. Probably the most commonly used devices to date are counters or detectors of the Geiger-Mueller type. Such counters include a cathode, usually of hollow cylindrical shape, which is positioned about a wire serving as an anode, the intervening and surrounding space being occupied by a suitable gas, the whole being enclosed by glass or some other suitable solid. The vessel as formed and filled with gas can be considered to be a detector head with which the gamma radiation interacts and from which electrons are discharged into the gas space to produce the required physical effect. Thus the detector head of a Geiger-Mueller counter can be considered to be of relatively low effective density since the gas space is essential to the operation of the counter. Because of this relatively low density, the probability of an interaction with or interception of the gamma radiation incident thereon is very low, and an efficiency of 0.5 per cent for this type of detector is considered good.

Another type of counter or detector is the so-called scintillation counter which employs a solid material as a detector head. This solid material is a luminophor, commonly called a phosphor, which interacts with the gamma photon and luminesces or gives off scintillations. Such a luminophor must be translucent to its own luminescent light, i. e., the scintillations discharged therefrom. The luminescent event, or scintillation, is the required physical effect, and the quality of translucency is necessary to permit the light of the scintillation to escape from the interior of the luminophor for physical observation. One advantage of the scintillation detector over the Geiger-Mueller detector is that the scintillation detector head is a solid of relatively greater density as contrasted to the less dense head of the Geiger-Mueller counter. Therefore, in the scintillation counter, there is a much greater probability of the gamma radiation interacting and producing the desired physical results. This feature is considered to be responsible for the scintillation detector having from 10 to 100 times the detecting efficiency of the Geiger-Mueller counter.

As is well known, the physical effect, i. e., the electrical discharge in the gas space in the Geiger-Mueller counter is easily capable of physical observation. On the other hand, the physical effect produced in the scintillation counter, i. e., the scintillation of light, is not so easily determined. The light of the scintillation falls on the cathode of a multiplier phototube which converts the light into an electrical pulse, and then amplifies the pulse. Tubes commonly used for this purpose are RCA types 931-A, 1P21, and 1P28. Such phototubes have the disadvantages that (1) they have small cathodes which collect only a small proportion of the light of scintillation, and (2) the cathode material used has such a low work-function that thermionic emission at room temperature causes a very troublesome "thermal background." Considerable amplification is required which in practice involves the use of a linear amplifier and discriminator for eliminating the smaller "thermal background" pulses.

In overcoming the aforesaid disadvantages of the prior art, it is a major object of this invention to provide novel detection means for penetrative radiation such as gamma radiation wherein the detection is more sensitive and the measurements more accurate.

Another object of the invention is the provision of novel detection means wherein relatively weak fluxes of penetrative radiation can be detected.

Still another object of the invention is the provision of novel detection means employing the scintillation effect for penetrative radiation as gamma radiation wherein the problem of "thermal background" is substantially eliminated and the circuitry necessary to the operation of the conventional scintillation counter is considerably simplified.

Further objects and advantages of the invention will appear from the following description and claims taken in connection with the attached drawing wherein:

Fig. 1 is a diagrammatic illustration of an embodiment of the invention.

Fig. 2 is a section taken through a modified form of detector embodying the present invention.

Fig. 3 is a section taken through another modification of the invention.

Fig. 4 is a section taken through still another modification.

Fig. 5 is a half section of the device of Fig. 4 taken on the line 5—5.

In brief, the present invention may be considered to involve the combination of a luminophor and a counter of the Geiger-Mueller type wherein the high efficiency of interception of the luminophor for penetrative radiation such as gamma radiation is combined with the positive action and relatively simple circuitry of the Geiger-Mueller counter.

Referring to Fig. 1, which illustrates somewhat diagrammatically the various elements involved and their respective functions, a luminophor 11 capable of intercepting penetrative radiation such as gamma radiation with the resultant discharge of scintillations of light photons is positioned adjacent a photo-sensitive tube 12 of the Geiger-Mueller type. The latter includes a central anode 13 surrounded by a cathode 14 of generally hollow cylindrical shape and formed either as a perforate cylinder or a cylinder of wire mesh, suitable materials employed therefor being described hereinafter. A housing 15 is provided about the cathode, the housing being formed of a material which permits the transmission of light photons from luminophor 11. Detector 12 must be sensitive in the spectral range in which the luminophor's scintillation lies.

Leads from anode 13 and cathode 14 of detector 12 are taken to a pre-amplifier 16 connected to a high voltage supply 17 and a scaling circuit and register 18. Since these elements are conventional in character and well known in the art, a detailed description thereof is considered unnecessary.

In operation, if it be assumed that a gamma photon 19 be directed against luminophor 11, the gamma photon will interact with the solid detector head of the luminophor to produce a scintillation of light photons 20. Such light as is directed toward detector 12 will be registered thereby in a positive manner and finally recorded on the register.

With this arrangement, a very high efficiency of detection for the penetrative radiation is obtained by reason of the solid or relatively dense character of the detector head of the luminophor. The resultant interaction which produces scintillations produces a marked and positive physical effect in detector 12 which is easily susceptible of physical observation and count. Each physical effect produced in the detector decays in a very short period of time so that the detector is ready for the next physical effect. Thus, all the essentials of a good detector are obtained without the disadvantages of the complicated circuitry and the difficulties attendant upon the use of a multiplier phototube and without the low efficiency for gamma radiation that is characteristic of the less dense head of the typical Geiger-Mueller counter.

Fig. 2 illustrates a modification wherein an anode 21 is combined with a hollow cylindrical cathode 22 formed of one of the materials hereinafter described and preferably perforate or of wire mesh. A housing 23 of glass of a character capable of passing the light scintillations is provided about the anode and cathode, the exterior of the housing being coated with a suitable luminophor 24 such as anthracene or naphthalene which may be cemented into place and formed as a uniform layer by combining the same with a transparent resin or other suitable plastic. If desired, the whole may then be enclosed in a suitable metal envelope, it being understood that the anode and cathode are connected to a conventional amplifier and to the apparatus necessary to register the counts as already explained in connection with Fig. 1.

Fig. 3 shows an arrangement wherein a counter is provided having an anode 31 formed of a series of wires 32 extending in directions substantially parallel to the axis of the detector. A cathode 33 is formed of a series of transverse metal plates, each plate having a series of holes 34 therein which are aligned so that anode wires 32 extend through the aligned holes of the series of cathode plates. Such an arrangement is disclosed in greater detail in United States Patent No. 2,397,071 of March 19, 1946, to D. G. C. Hare. The cathode and anode are enclosed by a housing 35 of a material which is transparent or translucent to the wave length of light photons discharged from a surrounding luminophor 36. Luminophor 36 is formed in the shape of an annulus concentrically disposed about the detector. In this arrangement, gamma radiation striking luminophor 36 will produce light scintillations which converge upon the detector from all sides. This arrangement insures that a large proportion of the light photons discharged from the luminophor are recorded by the detector.

Fig. 4 illustrates a modification wherein a substantially solid and cylindrical-shaped luminophor 41 is mounted inside a detector 42 which is shaped as a hollow open-ended cylinder or annulus. Detector 42 is formed of a series of spaced cathode rings 43 having openings 44 therein, the respective openings 44 in the several cathode plates 43 being aligned so that anodes 45 can be passed therethrough. All the cathode plates are electrically connected as by conductor 43a so that they function as a single cathode.

In this arrangement, gamma photons striking the luminophor produce scintillations which pass through an envelope 46 about the detector to produce the desired physical effect within the detector which enables subsequent counting.

In all the above embodiments a suitable envelope for the detector can be formed of Corning 9741 glass which has been found to permit the passage of over 80 per cent of light photons at 2,600 angstrom units.

Where materials characterized by high vapor pressures such as naphthalene are used as a luminophor, it is desirable except as hereinafter explained, that the luminophor be positioned outside the tube to prevent possible undesirable reactions with the cathode and the anode or condensation of the gas within the detector tube. With other luminophors such as calcium tungstate, the luminophor may be positioned inside the detector tube provided that it is placed exteriorly of the cathode. For instance, in the arrangement shown in Fig. 2, a luminophor such as calcium tungstate can be secured to the internal face of the tube by a suitable resin or plastic in much the same manner as materials used in fluorescent lighting tubes.

The counter enables the application of improved geometry, i. e., the use of large pieces of luminophor which can be shaped with reference to the detector so that relatively weak fluxes of penetrative radiation, ordinarily not detectable by present-day detectors, can be detected.

It is to be understood that the invention can also be used in a modification wherein the Geiger-Mueller element such as detector 12 in Fig. 1 is used as a proportional counter. The term Geiger-Mueller type detector as used herein is intended to define such an element whether used as a proportional counter or as the regular Geiger-Mueller counter and to include the various physical modifications disclosed herein.

Suitable materials for the cathode of the Geiger-Mueller element of the invention include calcium, barium, aluminum, molybdenum, magnesium, wolfram, zinc, copper, nickel, silver, carbon, potassium and sodium. In the case of sodium, it is contemplated that a film of sodium be deposited or otherwise formed on the inner face of the glass envelope to make the cathode, contact being made therewith by a cylindrical band formed of spring metal which expands out against the inner surface of the sodium-coated glass envelope. The use of a combination of caesium and antimony is contemplated where a glass envelope is filled with argon of high purity at about 10 cm. pressure. If desired, the cathode may be formed of one metal such as a 50 mesh copper screen and sodium or some other suitable metal deposited thereon.

With a hydrogen filling, carefully cleaned copper cathodes have been found to produce a light-sensitive counter.

In view of the foregoing, it is believed evident that the invention described herein represents a material improvement over the prior art in that it combines the advantages of the so-called scintillation and Geiger-Mueller counters and at the same time eliminates most, if not all, of the disadvantages characteristic thereof.

Obviously many modifications and variations of the invention, as hereinbefore set forth, may be made without departing from the spirit and scope thereof and, therefore, only such limitations should be imposed as are indicated in the appended claims.

I claim:

1. A detector for penetrative radiation such as gamma rays comprising a luminophor responsive to such radiation with the resultant emission of scintillations, and a Geiger-Mueller type detector directly sensitive to said scintillations positioned adjacent said luminophor, said detector including a photo-sensitive cathode having a relatively high work function as compared for example to metallic caesium, and a filling of ionizable gas at sufficient pressure to provide substantial gas amplification.

2. A detector for penetrative radiation such as gamma rays comprising a luminophor responsive to such radiation with the resultant emission of scintillations, and a Geiger-Mueller type detector directly sensitive to said scintillations positioned adjacent said luminophor and subject to said scintillations whereby the radiation incident on said luminophor is finally determined by said detector, said detector comprising an anode, a perforate cathode having a relatively high work function as compared for example to metallic caesium and a filling of ionizable gas at sufficient pressure to provide substantial gas amplification.

3. A detector for penetrative radiation such as gamma rays comprising a luminophor responsive to such radiation with the resultant emission of scintillations, and a Geiger-Mueller type detector directly sensitive to said scintillations positioned adjacent said luminophor and subject to said scintillations whereby the radiation incident on said luminophor is finally determined by said detector, said detector comprising an anode, a cathode formed of wire mesh having a relatively high work function as compared for example to metallic caesium and a filling of ionizable gas at sufficient pressure to provide substantial gas amplification.

4. A detector for penetrative radiation such as gamma rays comprising a luminophor responsive to such radiation with the resultant emission of scintillations, and a Geiger-Mueller type detector sensitive to said scintillations positioned adjacent said luminophor and subject to said scintillations whereby the radiation incident on said luminophor is finally determined by said detector, said detector comprising a metallic plate member forming a cathode having a relatively high work function as compared for example to metallic caesium, said plate being provided with at least one hole, an anode member comprising a wire extending through said hole and insulated from said cathode plate and a filling of an ionizable gas at a sufficient pressure to provide substantial gas amplification.

5. A detector for penetrative radiation such as gamma rays comprising a luminophor responsive to such radiation with the resultant emission of scintillations, said luminophor being formed as an annulus, and a Geiger-Mueller type detector positioned in said annulus, said detector including a cathode which is sensitive to said scintillations and has a relatively high work function as compared for example to metallic caesium and a filling of ionizable gas at sufficient pressure to provide substantial gas amplification, whereby the radiation incident on said luminophor is finally determined by said detector.

6. A detector for penetrative radiation such as gamma rays comprising a luminophor responsive to said radiation with the resultant emission of scintillations, and a Geiger-Mueller type detector sensitive to such scintillations, said detector comprising a plurality of relatively thin metallic annuli spaced substantially uniformly apart in a longitudinal bank and connected together electrically to form a cathode, said cathode having a relatively high work function as compared for example to metallic casesium, each annulus being provided with a plurality of openings and the openings in said annuli being disposed in aligned groups, an anode wire extending through the center of each group of openings, and a filling of ionizable gas at a sufficient pressure to provide substantial gas amplification, said luminophor being positioned in the central openings in said annuli whereby the detector is subject to scintillations from said luminophor and the radiation incident on said luminophor is detected by said detector.

7. A detector for penetrative radiation such as gamma rays comprising an anode and a cathode surrounded by a translucent envelope, said cathode being photo-sensitive and having a relatively high work function as compared for example to metallic caesium, said envelope being coated in part at least with a luminophor responsive to penetrative radiation with the resultant emission of scintillations to which the detector is sensitive, and said envelope containing a filling of ionizable gas at a sufficient pressure to provide substantial gas amplification.

8. A detector for penetrative radiation such as gamma rays comprising an anode and a cathode surrounded by a translucent envelope, said cathode being photo-sensitive and having a relatively high work function as compared for example to metallic caesium, said envelope being coated on its exterior in part at least with a luminophor responsive to penetrative radiation with the resultant emission of scintillations to which the detector is sensitive, said envelope containing a filling of ionizable gas at a sufficient pressure to provide substantial gas amplification.

9. A detector for penetrative radiation such as gamma rays comprising an anode and a cathode surrounded by a translucent envelope, said cathode being photo-sensitive and having a relatively high work function as compared for example to metallic caesium, said envelope being coated on its interior in part at least with a luminophor responsive to penetrative radiation with the resultant emission of scintillations to which the detector is sensitive, said envelope containing a filling of ionizable gas at a sufficient pressure to provide substantial gas amplification.

References Cited in the file of this patent

UNITED STATES PATENTS

| Number | Name | Date |
|---|---|---|
| 2,351,028 | Fearon | June 13, 1944 |
| 2,445,305 | Hochgesang | July 13, 1948 |

OTHER REFERENCES

Naphthalene Counters for Beta and Gamma Rays, Deutsch, Nucleonics, March 1948, pp. 58–59.

Electronic Fire and Flame Detector, Weisz, Electronics, July 1946, pp. 106–109.